Aug. 25, 1964 J. L. VICKERS ETAL 3,145,626
POWER STEERING MECHANISM
Filed Sept. 18, 1961 3 Sheets-Sheet 1
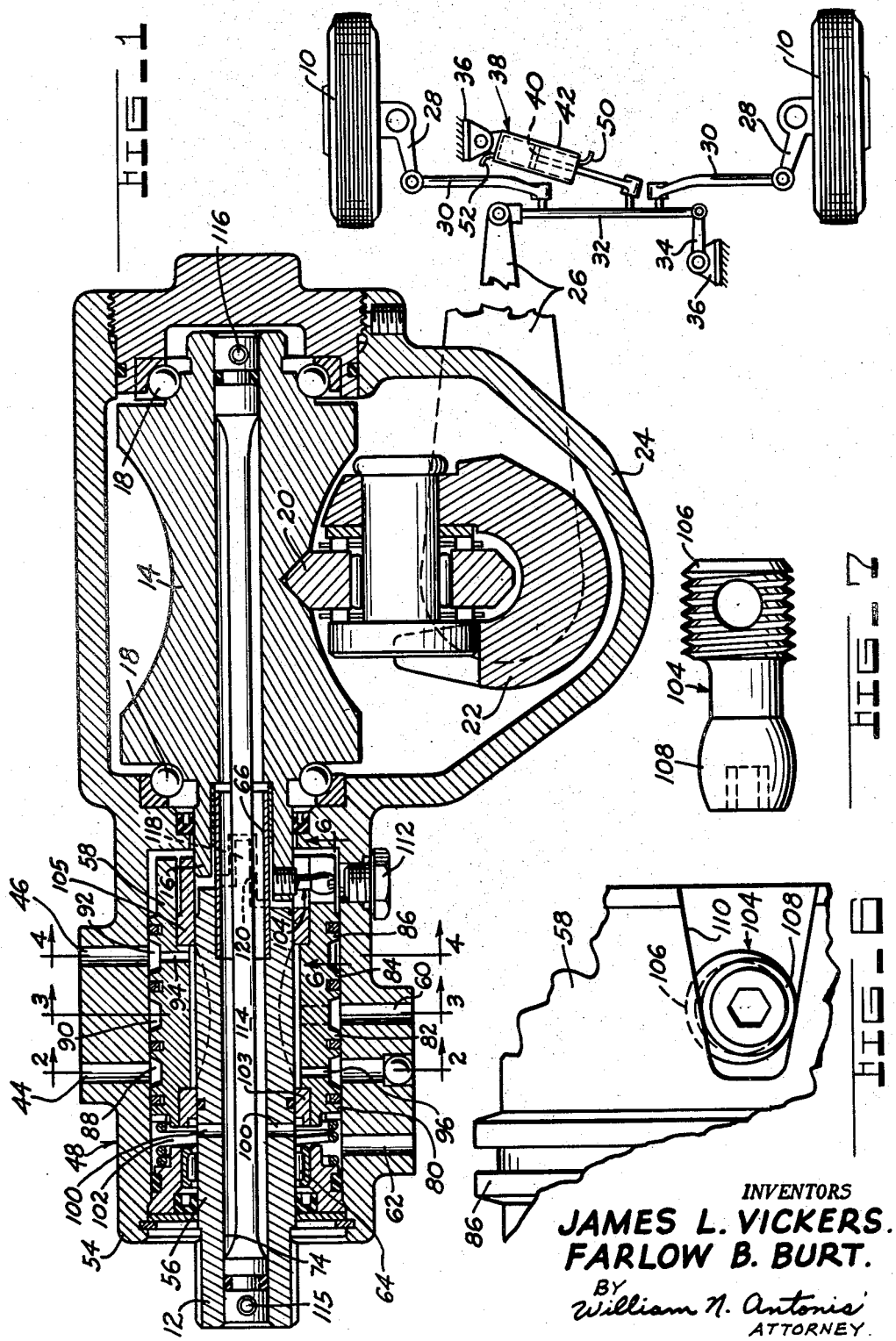
INVENTORS
JAMES L. VICKERS.
FARLOW B. BURT.
BY
William N. Antonio
ATTORNEY.

Aug. 25, 1964  J. L. VICKERS ETAL  3,145,626
POWER STEERING MECHANISM
Filed Sept. 18, 1961  3 Sheets-Sheet 2
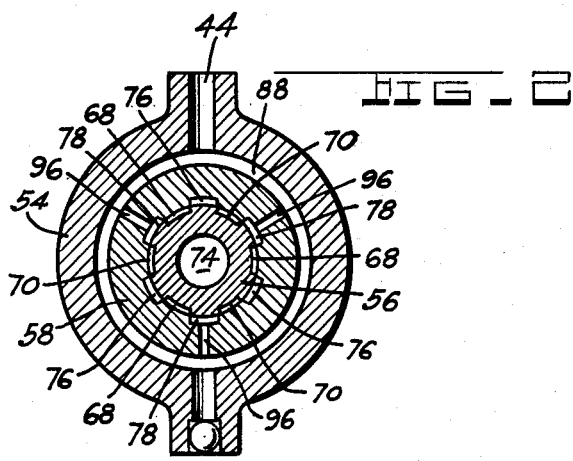
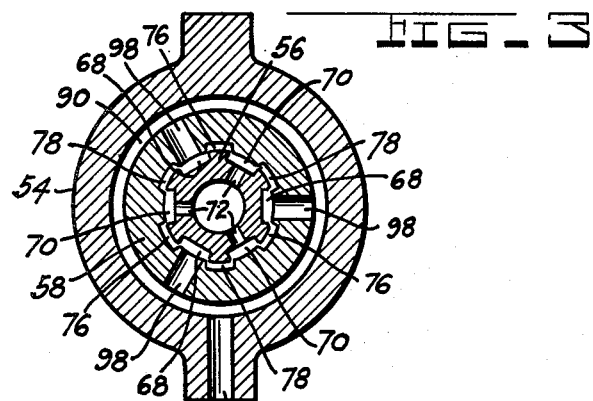
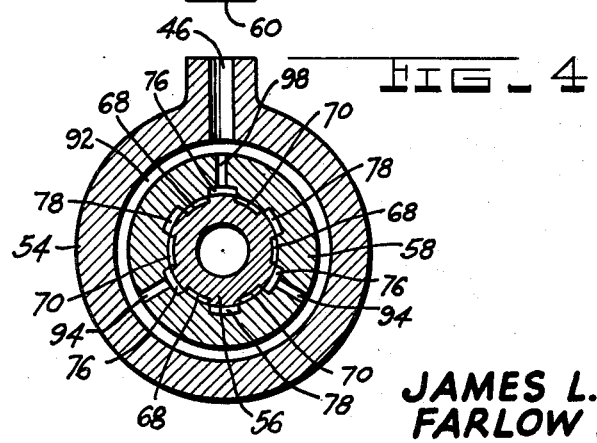
JAMES L. VICKERS.
FARLOW B. BURT.
INVENTORS
BY
William N. Antonis
ATTORNEY.

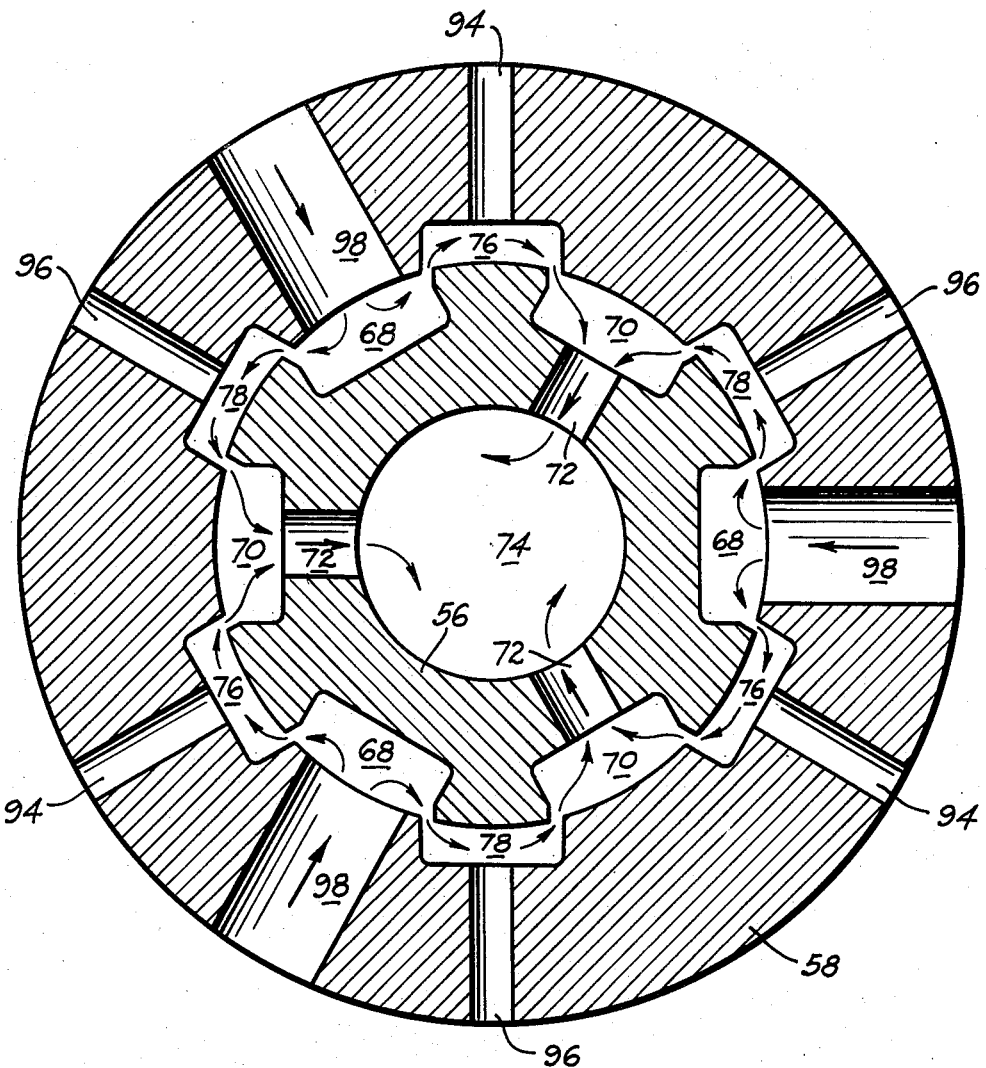

United States Patent Office 3,145,626
Patented Aug. 25, 1964

3,145,626
POWER STEERING MECHANISM
James L. Vickers and Farlow B. Burt, both of South Bend,
Ind., assignors to The Bendix Corporation, South Bend,
Ind., a corporation of Delaware
Filed Sept. 18, 1961, Ser. No. 138,755
14 Claims. (Cl. 91—375)

This invention relates to power steering and more particularly to a rotary valve for a power steering mechanism.

An object of this invention is to provide a conveniently small and mechanically simple rotary valve for a power steering mechanism which is economical to fabricate and is highly efficient in operation.

Another object of this invention is to provide a rotary valve for a power steering system wherein the valve rotor is also a fail-safe input shaft which will permit positive means for manual steering in the event of power failure.

More specifically, it is an object of this invention to provide a rotary valve wherein the main components thereof will be a combination fail-safe input shaft and valve rotor, a sleeve, and an outer housing.

A further object of this invention is to provide balanced forces within a rotary power steering valve by providing three equally spaced flow paths therein, thereby eliminating any stickiness due to hydraulic unbalance.

In this connection it is an object of this invention to provide a rotary valve which is ported in such a manner that the number of seals therein which are subjected to high differential pressures acting thereacross are no more than two at any given time.

An important object of this invention is to provide a rotary valve for a power steering system which includes means for "trimming" the valve, that is, to provide means for moving the valve sleeve relative to the valve rotor so as to eliminate any pressure differential across the power piston when the valve is in a center or neutral position.

The above and other objects and features of this invention will be apparent from the following description of the mechanism taken in connection with the accompanying drawings which form a part of this specification and in which:

FIGURE 1 is a sectional view of a power steering unit, constructed in accordance with the present invention, which is shown in association with parts of a vehicle drawn schematically;

FIGURE 2 is a sectional view taken along line 2—2 of FIGURE 1;

FIGURE 3 is a sectional view taken along line 3—3 of FIGURE 1;

FIGURE 4 is a sectional view taken along line 4—4 of FIGURE 1;

FIGURE 5 is a composite sectional view which shows the passages of FIGURES 2, 3, and 4 moved into the same plane for purposes of more clearly illustrating the flow paths within the valve;

FIGURE 6 is a view taken along line 6—6 of FIGURE 1; and

FIGURE 7 is an enlarged view of the "trimming" means.

Referring to FIGURE 1, it will be seen that reference numeral 10 designates the front wheels of a vehicle to be steered by rotation of a steering shaft (not shown) which is suitably connected to input shaft 12. Operatively connected to the input shaft 12 is a worm 14 having a shank 16 extending therefrom, both of which are held against axial displacement by thrust bearings 18 located at each end of the worm. A roller sector gear 20 is arranged in meshing relationship with the worm and is carried by one end of the sector shaft 22 which is suitably journaled in the housing 24. A pitman arm 26 is connected to the other end of sector shaft 22 and to the spindle arms 28 of the wheels 10 through a steering linkage assembly which includes tie rods 30, a cross tie rod 32, and an idler arm 34, suitably pivoted at one end to the vehicle frame 36.

The hydraulic system of the steering gear includes a fluid motor 38, which may be connected between the cross tie rod 32 and the vehicle frame 36 as shown in FIGURE 1. However, the fluid motor may be located at any other suitable position, e.g. integral with the steering gear. A piston 40 divides cylinder 42 into opposed chambers constantly communicating respectively with cylinder ports 44 and 46 of rotary valve 48, via conduits 50 and 52.

The main components of the rotary valve 48 are the housing 54, the rotor 56 which is formed on the end of input shaft 12, and the sleeve 58 which is located between the rotor and housing. Located in the housing 54 are inlet port 60, outlet port 62, and the two previously mentioned cylinder ports 44 and 46. The rotor 56, which rotates on a needle roller bearing 64 at the outer end and on a bronze bearing 66 in the input end of the worm 14, contains six axially extending equally spaced slots formed on the outer periphery thereof, three of which are designated by the reference numeral 68 and the other three of which are designated by the reference numeral 70. Radially extending passages 72 communicate rotor slots 70 with axially extending rotor bore 74. Located on the inner periphery of valve sleeve 58 are six axially extending equally spaced slots, three of which are designated by the reference numeral 76 and the other three of which are designated by the reference numeral 78. On the outer periphery of valve sleeve 58 are formed four annular lands 80, 82, 84 and 86 and three annular grooves 88, 90 and 92. Communication between sleeve slots 76 and annular groove 92 is provided through means of radially extending passages 94, whereas communication between sleeve slots 78 and annular groove 88 is provided through radially extending passages 96. Radially extending passages 98 communicate rotor slots 68 with annular groove 90. Thus, it can be seen from the drawings, particularly FIGURES 1 and 5, that when the rotary valve 48, which is an open center valve, is in a neutral straight ahead position, flow will occur from inlet port 60 to outlet port 62 via annular groove 90, radially extending sleeve passages 98, axially extending rotor slots 68, axially extending sleeve slots 76, axially extending rotor slots 70, radially extending rotor passages 72, rotor bore 74, radially extending passages 100, and outlet chamber 102. Cylinder port 44 communicates with sleeve slots 78 via radial sleeve passages 96 and annular groove 88, whereas cylinder port 46 communicates with sleeve slots 76 via radial passages 94 and annular groove 92.

Seals are located in annular lands 80, 82, 84 and 86 to prevent leakage thereacross. These seals are glass filled Teflon endless sealing rings of rectangular section. The glass content increases pressure which can be tolerated prior to extrusion and only slightly increases friction compared to pure Teflon. The glass filling is 15% ground fibers by weight. Higher percentages of glass reduce the ability of this material to stretch in addition to increasing the coefficient of friction of the material in contact with metals. Stop-off rings 103 and 105 seal off the axially extending sleeve slots 76 and 78 and also serve as bearings.

It will be noted that inlet port 60 communicates with the central annular groove 90, while the cylinder ports 44 and 46 communicate with the annular grooves 88 and 92 on either side thereof. Return pressures are channeled through the middle of the rotor to outlet port 62. This particular porting arrangement reduces the number of Teflon seals having high differential pressures acting thereacross at any given time to no more than two and does not create any axial unbalance in the valve.

An eccentric screw 104, as shown in FIGURES 1, 6, and 7 is used to key the valve sleeve 58 to the worm shank 16. The eccentric screw is threaded into the worm shank at one end 106 and has the other spherical head end 108 extending into and in contact with the tapered walls of a recess 110 which is cut into the end of valve sleeve 58. After removing the threaded plug 112 the eccentric screw 104 may be rotated by means of an Allen wrench so that the valve may be "trimmed." In other words, turning of the eccentric screw causes rotation of the sleeve with respect to the worm. Since index is held between the valve rotor 56 and worm 16 by means of torsion bar 114 which is pinned at one end 115 to the input rotor and at the other end 116 to the worm, this adjustment also rotates the sleeve with respect to the rotor thereby permitting balancing of the pressures on opposite sides of piston 40.

The three equally spaced flow paths previously described give balanced forces within the valve due to fluid flow, thereby eliminating any stickiness due to hydraulic unbalance. Upon rotation of the steering wheel the valve rotor 56 is rotated relative to the valve sleeve 58 as a result of deflection of the torsion rod 114 which connects the valve rotor and the steering gear worm. This movement is in proportion to input torque. As can more clearly be seen by reference to FIGURE 5, relative rotation between valve rotor 56 and valve sleeve 58 will cause one of the cylinder ports 44, 46 to communicate with the inlet port 60 and the other cylinder port to communicate with the outlet port 62. This will create a differential pressure across piston 40 and will result in power assisted steering. A mechanical drive-through is provided between the rotor 56 and worm 14 by means of a tongue and groove arrangement having sufficient clearance to provide for normal valve movement. In the event of power failure, the driver will deflect the torsion rod 114 until the tongue 118 contacts the wall 120 of the groove. Input torque is then transmitted exactly as in a manual steering system. The torsion rod 114 which connects the rotor and worm and provides mechanical "feel" permits the necessary angular movement required between the sleeve and rotor for valve operation.

The several practical advantages which flow from our invention are believed to be obvious from the above description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, applicants do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In a fluid operated servo device including an input member, an output member, and a fluid motor operatively connected to said output member, the combination within a housing, of a pair of relatively rotatable telescoped tubular elements through which fluid flow to and from said motor is controlled, said elements having a normally neutral position, and adjustment means operatively connected to said elements for rotating one of said elements relative to the other of said elements until said elements are in said normally neutral position.

2. In a fluid operated servo device including an input member, an output member, and a fluid motor operatively connected to said output member, the combination within a housing, of a pair of relatively rotatable telescoped tubular elements through which fluid flow to and from said motor is controlled, one of which is said input member and the other of which is a sleeve member located between said input member and said housing, said input and sleeve members having a normally neutral position, and adjustment means operatively connected to said sleeve member for rotating same with respect to said input member until said sleeve and input members are in said normally neutral position.

3. In a fluid operated servo device including an input member having a bore therein, an output member, and a fluid motor operatively connected to said output member, the combination within a housing, of a pair of relatively rotatable telescoped tubular elements through which fluid flow to and from said motor is controlled, one of which is said input member and the other of which is a sleeve member located between said input member and said housing, said input and sleeve members having a normally neutral position, a plurality of axially extending slots formed on the outer periphery of said input member and the inner periphery of said sleeve member, said slots being in overlapping relation when said input and sleeve members are in said normally neutral position, inlet, outlet and two cylinder ports located in said housing, inlet passage means located in said sleeve member for communicating half of the slots on said input member with said inlet port, outlet passage means located in said input member for communicating the other half of the slots on said input member with said outlet port via said bore in said input member, two cylinder passage means located in said sleeve member, one of which communicates half of the slots in said sleeve member with one of said cylinder ports and the other of which communicates the other half of said slots in said sleeve member with the other of said cylinder ports, and adjustment means operatively connected to said sleeve member for rotating same with respect to said input member until said sleeve and input members are in said normally neutral position.

4. A rotary valve for a power steering gear comprising a housing having a bore therein, inlet, outlet and two cylinder ports located in said housing, a pair of relatively rotatable nested tubular elements located in said bore, one of said elements being a combination input shaft and valve rotor and the other of said elements being a valve sleeve located between said rotor and housing, said rotor and sleeve having a normally neutral position with respect to each other, passage means located in said rotor and sleeve for alternately directing flow of fluid from said inlet port to one or the other of said cylinder ports upon rotation of said rotor with respect to said sleeve, a torsion bar having one end thereof rigidly connected to said input shaft rotor and the other end thereof rigidly connected to said steering gear, and adjustment means operatively connected to said valve sleeve for rotating same with respect to said input shaft rotor until said sleeve and rotor are in said normally neutral position, said adjustment means including an eccentric screw having a threaded end and a head end, one end of which is connected to said steering gear and the other end of which is connected to said sleeve.

5. A rotary valve as defined in claim 4 wherein means are provided for limited relative movement between said input shaft rotor and steering gear and positive engagement therebetween after the input shaft rotor has been rotated to the limit of its movement.

6. A rotary valve as defined in claim 5 wherein the means for providing limited relative movement between said input shaft rotor and steering gear includes a tongue formed on the end of said rotor and a groove fromed on the end of said gear.

7. A rotary valve for a power steering gear comprising a housing having a bore therein, inlet, outlet and two cylinder ports located in said housing, a pair of relatively rotatable nested tubular elements located in said bore, one of said elements being a valve rotor having a bore therein and the other of said elements being a valve sleeve located between said rotor and housing, said rotor and sleeve having a normally neutral position with respect to each other, means for opposing rotation of said rotor, three annular grooves formed on the outer periphery of said sleeve and defined by four annular lands each having an O-ring in sealing contact with said housing bore, passage means for communicating one of said outer annular grooves with one of said cylinder ports, the other of said outer annular grooves with said other cylinder port and the central annular groove with the inlet port, a plurality of axially extending slots formed on the inner periphery of said sleeve member, and the outer periphery of said rotor, said slots being in overlapping relation when said rotor and sleeve members are in said normally neutral position, inlet passage means located in said sleeve member for communicating half of the slots in said rotor with said central annular groove, outlet passage means located in said rotor for communicating the other half of the slots in said rotor with said outlet port via said bore in said rotor, and two cylinder passage means located in said sleeve member, one of which communicates half of the slots in said sleeve member with one of the outer annular grooves and the other of which communicates the other half of said slots in said sleeve with the other of the outer annular grooves.

8. A rotary valve as defined in claim 7 wherein said valve rotor is formed on the end of a steering input member.

9. A rotary valve as defined in claim 7 wherein said means for opposing rotation of said rotor comprises a torsion rod having one end operatively connected to said rotor and the other end operatively connected to said steering gear.

10. A rotary valve as defined in claim 7 wherein means are operatively connected between said rotor and sleeve for permitting relative rotary adjustment therebetween from an off-neutral to a neutral position.

11. A rotary valve as defined in claim 7 wherein said O-rings are glass filled Teflon rings.

12. In a fluid operated servo device including an input member, an output member, and a fluid motor operatively connected to said output member, the combination within a housing of a pair of relatively rotatable telescoped tubular elements through which fluid flow to and from said motor is controlled, one of which is said input member and the other of which is a sleeve member located between said input and said housing, said input and sleeve members having a normally neutral position, a plurality of axially extending slots formed on the outer periphery of said input member and the inner periphery of said sleeve member, said slots being in overlapping relation when said input and sleeve members are in said normally neutral position, inlet, outlet and two cylinder ports located in said housing, inlet passage means located in said sleeve member for communicating half of the slots on said input member with said inlet port, outlet passage means for communicating the other half of the slots on said input member with said outlet port, and two cylinder passage means located in said sleeve member, one of which communicates half of the slots in said sleeve member with one of said cylinder ports and the other of which communicates the other half of said slots in said sleeve member with the other of said cylinder ports.

13. The combination as defined in claim 12 wherein adjustment means are operatively connected to said sleeve member for rotating same with respect to said input member until said sleeve and input members are in said normally neutral position.

14. A rotary valve for a power steering gear comprising a housing having a bore therein, inlet, outlet and cylinder ports located in said housing, a pair of relatively rotatable nested tubular elements located in said bore, one of said elements being a valve rotor and the other of said elements being a valve sleeve located between said rotor and housing, said rotor and sleeve having a normally neutral position with respect to each other, means for opposing rotation of said rotor, at least two annular grooves formed on the outer periphery of said sleeve and defined by three annular lands each having sealing means in contact with said housing bore, passage means for communicating one of said annular grooves with said cylinder port and the other of said annular grooves with said inlet port, a plurality of axially extending slots formed on the inner periphery of said sleeve member and the outer periphery of said rotor, said slots being in overlapping relation when said rotor and sleeve members are in said normally neutral position, inlet passage means located in said sleeve member for communicating half of the slots in said rotor with the annular groove communicating with said inlet port, outlet passage means for communicating the other half of the slots in said rotor with said outlet port, and cylinder passage means located in said sleeve member for communicating half of the slots in said sleeve member with the annular groove communicating with said cylinder port.

References Cited in the file of this patent
UNITED STATES PATENTS

| | | |
|---|---|---|
| 1,947,973 | Davis | Feb. 20, 1934 |
| 3,022,772 | Zeigler et al. | Feb. 27, 1962 |